United States Patent
Kuo et al.

(10) Patent No.: US 8,059,157 B2
(45) Date of Patent: Nov. 15, 2011

(54) METHOD AND SYSTEM FOR DIGITAL IMAGE STABILIZATION

(75) Inventors: Tien-Ying Kuo, Taipei (TW); Chung-Hsin Wang, Changhua County (TW); Chih-Chun Lai, Taipei (TW)

(73) Assignee: Institute for Information Industry, Taipei (TW)

( * ) Notice: Subject to any disclaimer, the term of this patent is extended or adjusted under 35 U.S.C. 154(b) by 577 days.

(21) Appl. No.: 12/336,509

(22) Filed: Dec. 16, 2008

(65) Prior Publication Data
US 2010/0134640 A1 Jun. 3, 2010

(30) Foreign Application Priority Data
Dec. 3, 2008 (TW) .............................. 97146991 A

(51) Int. Cl.
*H04N 5/228* (2006.01)
(52) U.S. Cl. .................................................... 348/208.6
(58) Field of Classification Search ............. 348/208.99, 348/208.1, 208.3, 208.4, 208.6
See application file for complete search history.

(56) References Cited

U.S. PATENT DOCUMENTS

| 6,970,509 B2 * | 11/2005 | Xiang et al. ............. 375/240.16 |
| 7,035,332 B2 * | 4/2006 | He et al. .................... 375/240.02 |
| 2005/0207488 A1 * | 9/2005 | Ouyang et al. ............. 375/240.2 |
| 2008/0247462 A1 * | 10/2008 | Demos ..................... 375/240.03 |

* cited by examiner

*Primary Examiner* — Nicholas Giles
(74) *Attorney, Agent, or Firm* — Jianq Chyun IP Office

(57) ABSTRACT

A method and a system for digital image stabilization are provided for a digital image sequence. The present method calculates local motion vectors between two adjacent images by an interlaced Gray-coded bit-plane matching. An appropriate global motion vector is obtained by weighted accumulation of all local motion vectors. Finally, an accumulated motion vector is obtained by the global motion vector so as to process a motion correction on the digital image sequence and produce a stabile output image.

24 Claims, 5 Drawing Sheets

| Difference of average value and minimum value $C_{diff}$ | Accumulated weighted value |
|---|---|
| $C_{diff} \geq 128$ | 8 |
| $64 \leq C_{diff} < 128$ | 4 |
| $32 \leq C_{diff} < 64$ | 2 |
| $16 \leq C_{diff} < 32$ | 1 |
| $C_{diff} < 16$ | 0 |

METHOD AND SYSTEM FOR DIGITAL IMAGE STABILIZATION

CROSS-REFERENCE TO RELATED APPLICATION

This application claims the priority benefit of Taiwan application serial no. 97146991, filed on Dec. 13, 2008. The entirety of the above-mentioned patent application is hereby incorporated by reference herein and made a part of this specification.

BACKGROUND OF THE INVENTION

1. Field of the Invention

The present invention relates to a method for processing a digital image and particularly to a method and a system for digital image stabilization.

2. Description of Related Art

As technology advances, electronic products are developed to have more powerful functions. Besides multiple functions and practicality, electronic products are being miniaturized to meet the consumers' requirements. However, light and small-sized electronic products which have image capturing function are not easy to hold and easily result in image blurs.

Accordingly, the technology, image stabilization (IS), is developed to solve this problem. A digital image stabilization (DIS) system mainly includes a motion estimation (ME) unit and a motion correction (MC) unit. The ME unit is used for obtaining the local motion vectors of a plurality of areas in an image, so as to determine a global motion vector of the motion of the whole image. The MC unit is used for removing unnecessary blurs from the image based on the information obtained by the ME unit, and thereby produces stabile image output.

Mostly, the ME unit calculates the local motion vectors by a single bit-plane matching method or a multiple bit-plane matching method. Herein, the single bit-plane matching method carries out estimation merely based on the information of a certain frequency band in the image. Therefore, this method cannot provide favorable estimation of various images. Furthermore, when performing matching on an original image, this method consumes more time in binary bit-plane processing. The multiple bit-plane matching method simply analyzes an original bit-plane of the image, and two pixels having similar gray-scale values may result in different binary values in some original bit-planes, which reduces the accuracy of matching. In addition, a global motion estimation (GME) method performed by the ME unit is mainly to calculate the global motion vector based on all the local motion vectors. However, not all the local motion vectors indicate the actual motion directions. For this reason, the estimated global motion vector becomes inaccurate.

The aforementioned situations all bring negative influences to the digital image stabilization system, which not only impairs the accuracy of outputting stabile images but also complicates the hardware of the system.

SUMMARY OF THE INVENTION

The present invention provides a method for digital image stabilization, which is able to perform image bit-plane matching rapidly and accurately and simplify the complexity of calculating local motion vectors during image stabilization.

The present invention provides a system for digital image stabilization, which prevents misjudgment of a global motion vector of an image, resulting from unreliable local motion vectors.

For the above and other purposes, the present invention provides a method for digital image stabilization, which is applicable to an image sequence including a plurality of images, wherein each of the images conforms to a pixel depth. The method first divides a current image into a plurality of target blocks and defines search areas respectively corresponding to the target blocks in a previous image. Then, according to a plurality of raw bit-planes corresponding to the current image, K Gray-coded bit-planes of the current image are defined. Further, according to a plurality of raw bit-planes corresponding to the previous image, K Gray-coded bit-planes of the previous image are defined, wherein K is a positive integer smaller than the pixel depth. Next, each of the target block and the corresponding search area thereof which are respectively formed by interlacing the K Gray-coded bit-planes are compared, so as to obtain a plurality of correlation measures between each target block and the corresponding search area thereof. Finally, a global motion vector of the current image relative to the previous image is calculated based on an average value and a minimum value of all the correlation measures of each target block, and an accumulated motion vector reflecting a motion of the image sequence is calculated according to the global motion vector, so as to decide an output image accordingly.

In an embodiment of the present invention, the target blocks do not overlap with each other, and each of the target blocks is smaller than or equal to the corresponding search area thereof.

In an embodiment of the present invention, the method further comprises performing Gray-coded transformation on each raw bit-plane and obtaining K transformed raw bit-planes to serve as K Gray-coded bit-planes.

In an embodiment of the present invention, before the step of comparing the target block and the corresponding search area thereof respectively formed by interlacing the K Gray-coded bit-planes, the method further comprises selecting one of the target blocks. Following that, a plurality of candidate blocks are defined in the search area corresponding to the selected target block, and a size of each of the candidate blocks conforms to the target block. Thereafter, the selected target block and each candidate block are respectively divided into a plurality of grids, and each of the grids represents a pixel. Finally, one of the K Gray-coded bit-planes corresponding to the current image is assigned to every K girds of the selected target block in an interlaced manner and one of the K Gray-coded bit-planes corresponding to the previous image is assigned to every K girds of each of the candidate blocks in an interlaced manner, so as to form the interlaced Gray-coded bit-planes of the selected target block and the candidate block respectively.

In an embodiment of the present invention, the step of comparing the selected target block with the corresponding search area thereof to obtain correlation measures comprises performing a Boolean function operation on the interlaced Gray-coded bit-planes of the selected target block and each candidate block, and adopting an operation result to serve as the correlation measures of the selected target block.

In an embodiment of the present invention, after the step of performing the Boolean function operation, the method further comprises adopting a motion vector having the smallest correlation measure to serve as a local motion vector of the selected target block.

In an embodiment of the present invention, the method further comprises defining a plurality of value zones, and each of the value zones corresponds to an accumulated weighted value respectively. After the average value and the minimum value of all the correlation measures of the selected target block are calculated, a difference between the average value and the minimum value is obtained, so as to determine which value zone the difference belongs to. Finally, the accumulated weighted value corresponding to the local motion vector of the selected target block is given.

In an embodiment of the present invention, the step of estimating the global motion vector indicating the current image motion comprises computing the local motion vector having the most accumulation times according to the local motion vector of each target block and the corresponding accumulated weighted values thereof. Then, the local motion vector having the most accumulation times is adopted to serve as the global motion vector of the current image.

In an embodiment of the present invention, the step of calculating the accumulated motion vector comprises computing a sum of the global motion vectors estimated based on every two adjacent images between an initial image and the current image, and adopting the sum as the accumulated motion vector.

In an embodiment of the present invention, a resolution of the output image is smaller than the current image.

In an embodiment of the present invention, the step of determining the output image based on the accumulated motion vector comprises providing an adjustment threshold value. When the accumulated motion vector is smaller than or equal to the adjustment threshold value, the output image is decided based on the accumulated motion vector. When the accumulated motion vector is larger than the adjustment threshold value, the output image is determined based on the positive or negative of the accumulated motion vector and the adjustment threshold value. Herein, the adjustment threshold value corresponds to the resolutions of the current image and the output image.

From another aspect, the present invention provides a system for digital image stabilization, including a local motion vector computing device, a global motion vector computing device, and a motion correction device. Herein, the local motion vector computing device is used for receiving an image sequence comprising a plurality of images, and each of the images conforms to a pixel depth. The local motion vector computing device divides a current image into a plurality of target blocks, defines search areas respectively corresponding to the target blocks in a previous image, and respectively defines K Gray-coded bit-planes of the current image and K Gray-coded bit-planes of the previous image based on a plurality of raw bit-planes corresponding to the current image and the previous image. Then, the target block and the corresponding search area thereof which are respectively formed by interlacing the K Gray-coded bit-planes are compared, so as to obtain a plurality of correlation measures between each of the target blocks and the corresponding search area thereof. Herein, K represents a positive integer smaller than the pixel depth. The global motion vector computing device is used together with the local motion vector computing device for estimating a global motion vector indicating a motion of the current image relative to the previous image, based on an average value and a minimum value of all the correlation measures of each target block. The motion correction device is connected to the global motion vector computing device for calculating an accumulated motion vector reflecting a motion of the image sequence based on the global motion vector, and deciding an output image from the current image according to the accumulated motion vector.

In an embodiment of the present invention, the target blocks do not overlap with each other, and each of the target blocks is smaller than or equal to the corresponding search area thereof.

In an embodiment of the present invention, the local motion vector computing device further comprises a Gray-coded transforming unit for performing a Gray-coded transformation on each of the raw bit-planes and adopting K transformed raw bit-planes to serve as K Gray-coded bit-planes.

In an embodiment of the present invention, the local motion vector computing device further comprises an interlaced Gray-coded bit-planes generating unit for selecting one of the target blocks and defining a plurality of candidate blocks in the search area corresponding to the selected target block. The selected target block and each of the candidate blocks are respectively divided into a plurality of grids, and one of the K Gray-coded bit-planes corresponding to the current image is assigned to every K grids of the selected target block in an interlaced manner, and one of the K Gray-coded bit-planes corresponding to the previous image is assigned to every K grids of each of the candidate blocks in an interlaced manner, so as to respectively form interlaced Gray-coded bit-planes of the selected target block and the candidate blocks. Herein, a size of each of the candidate blocks conforms to the target block, and each of the grids represents a pixel.

In an embodiment of the present invention, the local motion vector computing device further comprises a matching unit for performing a Boolean function operation on the interlaced Gray-coded bit-planes of the selected target block and the candidate blocks, and adopting an operation result thereof to serve as the correlation measures of the selected target block.

In an embodiment of the present invention, the matching unit obtains a motion vector having the smallest correlation measures to serve as the local motion vector of the selected target block.

In an embodiment of the present invention, the matching unit calculates an average value and a minimum value of all the correlation measures of the selected target block. The global motion vector computing device defines a plurality of value zones, and each of the value zones respectively corresponds to an accumulated weighted value. After a difference between the average value and the minimum value is obtained, the value zone to which the difference belongs is determined, and the accumulated weighted value corresponding to the local motion vector of the selected target block is given.

In an embodiment of the present invention, the global motion vector computing device obtains the local motion vector having the most accumulation times based on the local motion vector of each target block and the corresponding accumulated weighted value thereof, and adopts the local motion vector having the most accumulation times to serve as the global motion vector of the current image.

In an embodiment of the present invention, the motion correction device computes a sum of the global motion vectors estimated based on every two adjacent images between an initial image and the current image, and adopts the sum as the accumulated motion vector.

In an embodiment of the present invention, a resolution of the output image is smaller than a resolution of the current image.

In an embodiment of the present invention, the motion correction device obtains an adjustment threshold value. When the accumulated motion vector is smaller than or equal to the adjustment threshold value, the output image is determined according to the accumulated motion vector; and when the accumulated motion vector is larger than the adjustment threshold value, the output image is determined based on the positive or negative of the accumulated motion vector and the adjustment threshold value. Herein, the adjustment threshold value corresponds to the resolutions of the current image and the output image.

Based on the above, the present invention calculates the local motion vectors of two adjacent images by matching and comparing the interlaced Gray-coded bit-planes. Further, an appropriate global motion vector is determined by weighted accumulation of all the local motion vectors. Thereby, the complexity of calculation during image stabilization is decreased, and the reliability of the stabilization result is greatly enhanced.

To make the above features and advantages of the present invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
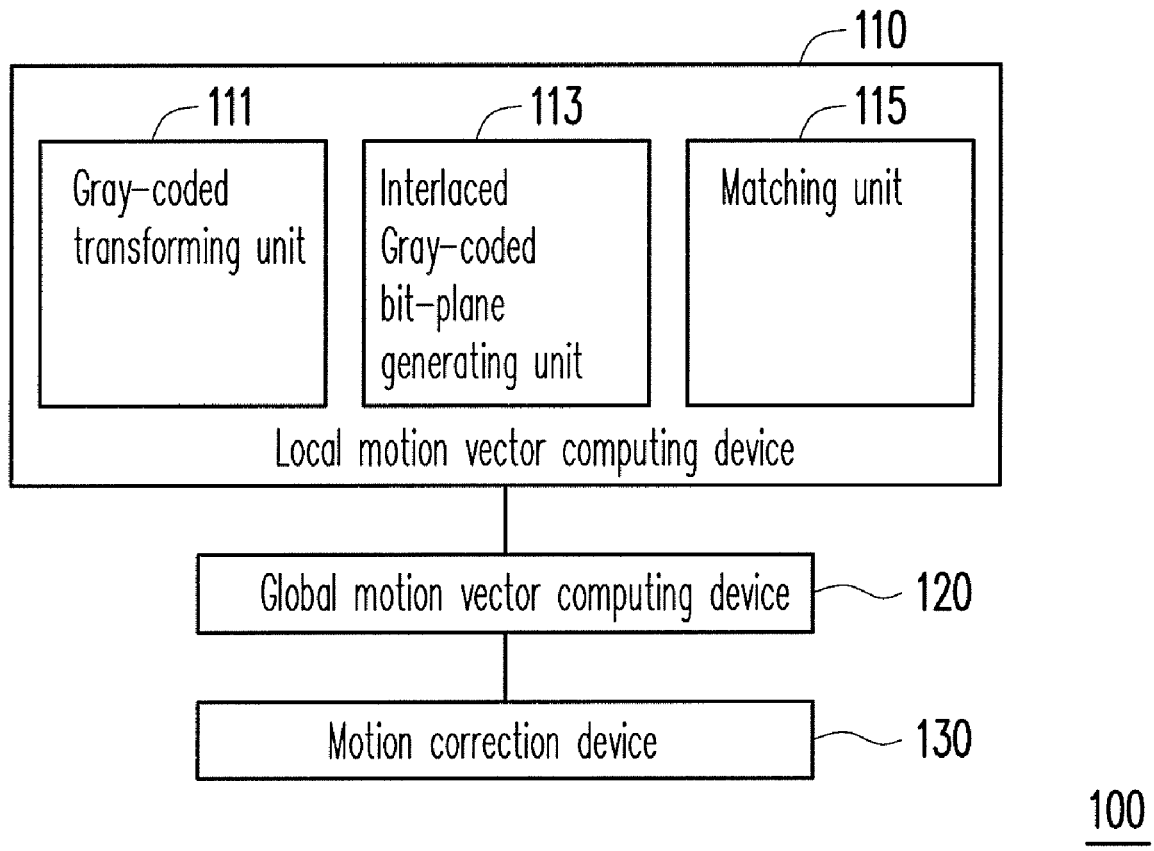
FIG. 1 is a block diagram of a system for digital image stabilization according to one embodiment of the present invention.

FIG. 1 is a block diagram of a system for digital image stabilization according to one embodiment of the present invention. With reference to FIG. 1, a system 100 for digital image stabilization, comprising a local motion vector computing device 110, a global motion vector computing device 120, and a motion correction device 130, is used for quickly obtaining a local motion vector of an image by matching interlaced Gray-coded bit-planes and estimating the reliability of the local motion vector, so as to obtain an appropriate global motion vector for processing a motion correction on an image sequence. Herein, the system 100 may be disposed in various image-capturing products, such as video cameras or mobile video telephones. However, the range of the image-capturing products is not limited to the foregoing descriptions. The functions of each device in the system 100 are detailed in the following paragraphs.

In this embodiment, the local motion vector computing device 110 includes a Gray-coded transforming unit 111, an interlaced Gray-coded bit-plane generating unit 113, and a matching unit 115. Herein, the local motion vector computing device 110 may be formed by hardware or software capable of operation processing, or a combination thereof. After receiving an image sequence comprising a plurality of images, the local motion vector computing device 110 uses the three units disposed therein to establish an interlaced Gray-coded bit-plane, so as to obtain a plurality of correlation measures and local motion vectors of all the target blocks in a current image relative to a previous image. In one embodiment, the local motion vector computing device 110 may establish the interlaced Gray-coded bit-planes of the current image and the previous image when receiving the image sequence. However, in another embodiment, the local motion vector computing device 110 may also dynamically obtain the interlaced Gray-coded bit-planes while performing comparison. The present invention does not restrict the timing of obtaining the interlaced Gray-coded bit-planes.

The global motion vector computing device 120 and the local motion vector computing device 110 are connected with each other, so as to accumulate each local motion vector based on all the correlation measures of each target block, for example establishing a column chart of the local motion vectors, and adopt one local motion vector having the largest accumulation in the column chart to serve as a global motion vector indicating a motion of the current image. Herein, the global motion vector computing device 120 may be formed by hardware or software capable of operation processing, or a combination thereof.

The motion correction device 130 connected with the global motion vector computing device 120 is used for calculating an accumulated motion vector reflecting a motion of the whole image sequence, and determining an output image from the current image based on the accumulated motion vector. Herein, the motion correction device 130 may be formed by hardware or software capable of operation processing, or a combination thereof. The present invention does not restrict the elements of the motion correction device 130. In the following paragraphs, how the system 100 functions is described in detail to further explain the present invention.

Figure 2:
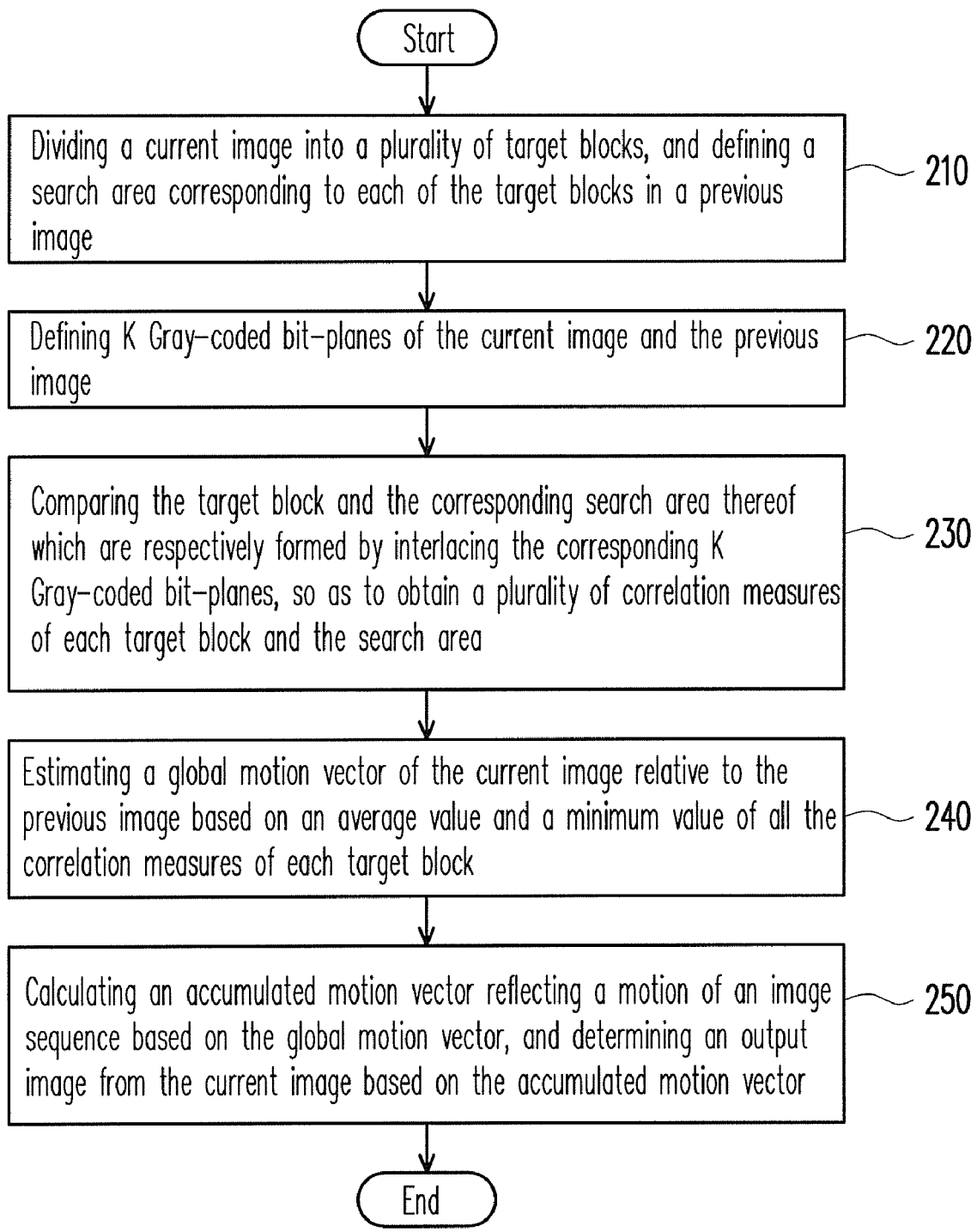
FIG. 2 is a flowchart of a method for digital image stabilization according to one embodiment of the present invention.

FIG. 2 is a flowchart of a method for digital image stabilization according to one embodiment of the present invention. With reference to FIG. 1 and FIG. 2, because the local motion vector computing device 110 computes the local motion vector by block matching, after receiving the image sequence comprising a plurality of images, as shown in Step 210, the local motion vector computing device 110 first divides the current image into a plurality of target blocks and defines search area respectively corresponding to each of the target blocks in a previous image. Herein, the target blocks do not overlap with each other, and each of the target blocks is smaller than or equal to the corresponding search area thereof.

Then, as shown in Step 220, through the Gray-coded transforming unit 111 in the local motion vector computing device 110, K Gray-coded bit-planes of the current image and K Gray-coded bit-planes of the previous image are separately defined based on a plurality of raw bit-planes corresponding to the current image and a plurality of raw bit-planes corresponding to the previous image. Herein, each image in the image sequence includes a pixel depth, and K is a positive integer smaller than the pixel depth. Specifically, an image having a pixel depth D is represented by the following binary formula:

$$f(x,y) = b_{D-1}(x,y)2^{D-1} + b_{D-2}(x,y)2^{D-2} + \ldots + b_1(x,y)2^1 + b_0(x,y)2^0$$

Herein, (x,y) represents a position of a pixel in the image, and $b_i(x,y)$ represents a raw bit-plane of i scale (wherein i is a positive integer smaller than D). After the current image and the previous image are respectively represented by the aforementioned binary formula, the Gray-coded transforming unit 111 may obtain all the raw bit-planes of the current image and all the raw bit-planes of the previous image, and perform Gray-coded transformation on each raw bit-plane. K transformed raw bit-planes of the current image are then adopted to serve as K Gray-coded bit-planes thereof, and K transformed raw bit-planes of the previous image are then adopted to serve as K Gray-coded bit-planes thereof. For instance, the Gray-coded transforming unit 111 performs the Gray-coded transformation based on the following formula:

$$g_{D-1} = b_{D-1}$$

$$g_i = b_i \oplus b_{i+1}, 0 \leq i \leq D-2$$

Herein, $b_{D-1}$, $b_i$, and $b_{i+1}$ represent the raw bit-planes, and $g_{D-i}$ and $g_i$ represent the transformed Gray-coded bit-planes. In this embodiment, provided that the pixel depth of each image in the image sequence is 8, the Gray-coded transforming unit 111 would separately perform Gray-coded transformation on 8 raw bit-planes respectively corresponding to the current image and the previous image, so as to obtain 4 Gray-coded bit-planes of the current image and 4 Gray-coded bit-planes of the previous image.

Thereafter, in Step 230, the local motion vector computing device 110 separately forms the target block and the corresponding search area thereof by interlacing the corresponding K (for example, 4) Gray-coded bit-planes. Then, the results of the interlacing are compared and matched to obtain a plurality of correlation measures between the target block and the search area.

Take one target block in the current image as an example, after the Gray-coded transforming unit 111 defines the K Gray-coded bit-planes of the current image and the K Gray-coded bit-planes of the previous image, the interlaced Gray-coded bit-plane generating unit 113 divides the target block into a plurality of grids in unit of pixel. In other words, each of the grids represents one pixel. Next, one of the K Gray-coded bit-planes corresponding to the current image is assigned to every K grids of the target block in an interlaced manner, so as to obtain an interlaced Gray-coded bit-plane of the target block.

Figures 3, 4:
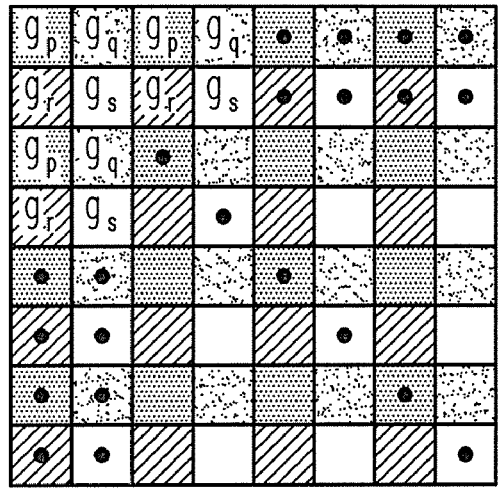
FIG. 3 is a schematic view of an interlaced Gray-coded bit-plane according to one embodiment of the present invention.
FIG. 4 is a table of value zones and accumulated weighted values according to one embodiment of the present invention.

Provided that the Gray-coded transforming unit 111 obtains 4 Gray-coded bit-planes, i.e. $g_p$, $g_q$, $g_r$, and $g_s$, of the current image, the interlaced Gray-coded bit-plane established by the Gray-coded bit-plane generating unit 113 is the same as an interlaced Gray-coded bit-plane 300 as shown in FIG. 3, wherein $g_p$, $g_q$, $g_r$, and $g_s$ are interlaced to indicate the four pixels in the image. Herein, p, q, r, and s represent four values selected from 0 to D−1. In this embodiment, p, q, r, and s are 2, 3, 4, and 5, for example.

In addition to the establishment of the interlaced Gray-coded bit-plane of the target block in the current image, the interlaced Gray-coded bit-plane generating unit 113 also defines a plurality of candidate blocks in the search area corresponding to the target block, and establishes interlaced Gray-coded bit-planes for the candidate blocks by the aforementioned process. Herein, a size of each of the candidate blocks conforms to a size of the target block.

After the interlaced Gray-coded bit-planes of the target block and the interlaced Gray-coded bit-planes of the candidate blocks are established, the matching unit 115 performs a bit-matching process on the interlaced Gray-coded bit-planes. In this embodiment, the matching unit 115 performs a Boolean function operation (XOR operation, for example) on the interlaced Gray-coded bit-planes of the target block and the candidate blocks, and adopts the operation results as the correlation measures of the target block. Herein, the matching unit 115, for example, calculates the correlation measures $C(m,n)$ based on the following formula:

$$C(m, n) = \sum_{x=0}^{M-1} \sum_{y=0}^{N-1} I_G^t(x, y) \oplus I_G^{t-1}(x+m, y+n), -p \leq m, n \leq p-1$$

In the above formula, $I_G^t(x,y)$ and $I_G^{t-1}(x,y)$ respectively represent the interlaced Gray-coded bit-plane of the target block in the current image and the interlaced Gray-coded bit-plane of each candidate block in the previous image, M×N represents the sizes of the target block and the candidate blocks, and p is a parameter for determining the size of the search area. In this embodiment, the matching unit 115 adopts a motion vector (m,n) which generates the smallest correlation measures $C(m,n)$ as the local motion vector of the target block.

After the Gray-coded transforming unit 111 separately obtains the K Gray-coded bit-planes of the current image and the previous image, the interlaced Gray-coded bit-plane generating unit 113 may sequentially select one of the target blocks in the current image for generating the interlaced Gray-coded bit-planes of the selected target block and the interlaced Gray-coded bit-planes of the corresponding candidate blocks thereof. The matching unit 115 then calculates a plurality of correlation measures and the local motion vector of the selected target block. Thereby, all the correlation measures and the local motion vector corresponding to each target block in the current image are obtained.

Following that, in Step 240, the global motion vector computing device 120 estimates a global motion vector indicating a motion of the current image relative to the previous image based on the correlation measures of each target block. Considering that the local motion vector obtained by matching homogeneous blocks in one homogeneous search area (for example, the brightness in the area is nearly uniform) is not reliable, the global motion vector computing device 120 in this embodiment additionally includes all the correlation measures of each target block for estimating the global motion vector, so as to prevent unreliable local motion vectors from influencing the accuracy of the global motion vector.

To be more specific, the global motion vector computing device 120 defines a plurality of value zones in advance, and defines the accumulated weighted value corresponding to each of the value zones. Herein, the larger the accumulated weighted value is, the more the accumulation times are. After the matching unit 115 calculates the average value and the minimum value of all the correlation measures of each target block and transmits the average value and the minimum value to the global motion vector computing device 120, the global motion vector computing device 120 determines within which value zone a difference of the average value and the minimum value falls, and then adds the accumulated weighted value corresponding to the value zone to the local motion vector of the target block. Thereafter, the global motion vector computing device 120 obtains the local motion vector having the most accumulation times based on the local motion vector of each target block and the corresponding accumulated weighted value thereof, and adopts the local motion vector having the most accumulation times as the global motion vector of the current image.

FIG. 4 is a table of value zones and accumulated weighted values according to one embodiment of the present invention. Herein, the global motion vector computing device 120 defines five value zones in total. Given that the minimum value of all the correlation measures of one target block subtracted from the average value of all the correlation measures of the target block is larger than 128, the accumulated weighted value of the local motion vector of the target block is equal to 8.

Referring to the embodiment in FIG. 4, given that the current image comprises four target blocks, i.e. $B_1$, $B_2$, $B_3$, and $B_4$, the corresponding local motion vectors thereof are $LMV_1$, $LMV_2$, $LMV_3$, and $LMV_4$. Provided that the minimum value of all the correlation measures of the target block $B_1$ subtracted from the average value thereof is between 16 and 32, the accumulated weighted value of the local motion vector $LMV_1$ of the target block $B_1$ is 1. Given that the minimum value of all the correlation measures of the target block $B_2$ subtracted from the average value thereof is larger than 128, the accumulated weighted value of the local motion vector $LMV_2$ of the target block $B_2$ is 8. Provided that the minimum value of all the correlation measures of the target blocks $B_3$ and $B_4$ subtracted from the average value thereof is also between 16 and 32, the accumulated weighted values of the local motion vectors $LMV_3$ and $LMV_4$ are both equal to 1 as well. As described above, the global motion vector computing device 120, for example, outputs a column chart of all the local motion vectors and adopts the local motion vector having the highest accumulation times (i.e. the local motion vector $LMV_2$ in this embodiment) to serve as the global motion vector of the current image.

Finally, as shown in Step 250, the motion correction device 130 calculates the accumulated motion vector reflecting the motion of the whole image sequence based on the global motion vector, and determines a stabile output image from the current image based on the accumulated motion vector. Herein, a resolution of the output image is smaller than the resolution of the current image. Because the global motion vector obtained by the global motion vector computing device 120 merely reflects the motion of the current image and the previous image, in order to stabilize the whole image sequence, the motion correction device 130 further computes a sum of the global motion vectors estimated based on every two adjacent images between the initial image and the current image, and adopts the sum as the accumulated motion vector. In this embodiment, the accumulated motion vector $AMV^t$ is calculated as follows:

$$AMV^t = \begin{cases} 0, & t = 0 \\ AMV^{t-1} + GMV^t, & t \geq 1 \end{cases}$$

Herein, $AMV^t$ and $AMV^{t-1}$ respectively represent the accumulated motion vectors of the t and the t−1 images. $GMV^t$ represents the global motion vector obtained based on the t and the t−1 images.

Figure 5:
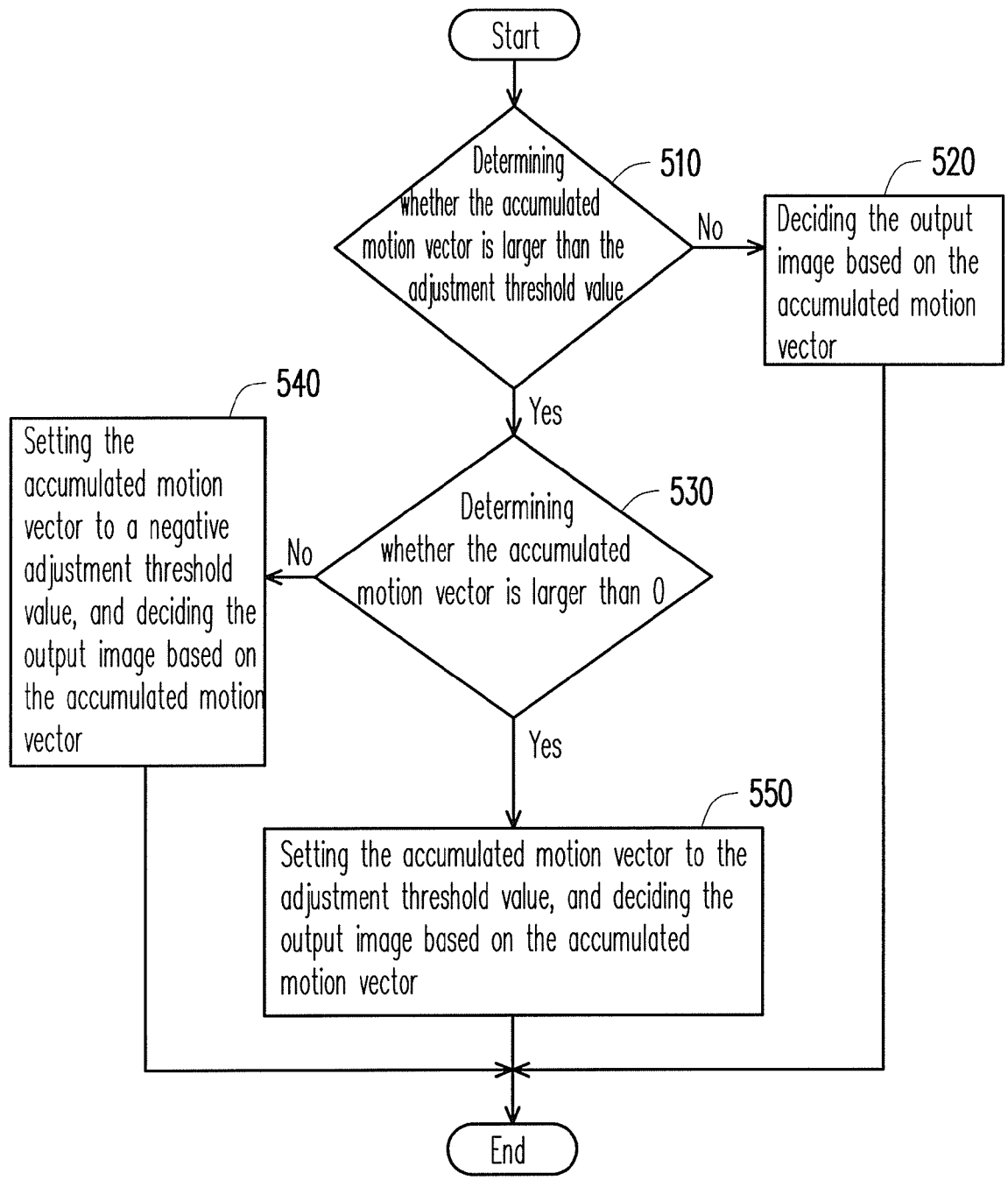
FIG. 5 is a flowchart of determining an output image according to one embodiment of the present invention.

It should be noted that the motion correction device 130 further defines an adjustment threshold value to serve as a basis for motion correction, so as to prevent the accumulated motion vector from exceeding a motion correction range. Herein, the adjustment threshold value corresponds to the resolutions of the current image and the output image. For instance, provided that the resolution of the current image is 160×128 and the resolution of the output image is 144×112, the adjustment threshold value is 8. FIG. 5 is a flowchart of determining an output image according to one embodiment of the present invention. As shown in FIG. 5, first in Step 510, the motion correction device 130 judges whether the accumulated motion vector is larger than the adjustment threshold value. If the accumulated motion vector is smaller than or equal to the adjustment threshold value, the output image is decided based on the accumulated motion vector, as shown in Step 520. However, if the accumulated motion vector is larger than the adjustment threshold value, which indicates that the user intentionally moves the image-capturing product horizontally, the output image would exceed the range defined by the original image when the output image is determined directly based on the accumulated motion vector. Following that, Step 530 is to determine whether the accumulated motion vector is positive or negative (to judge whether the accumulated motion vector is larger than 0). If the accumulated motion vector is negative, in Step 540, the accumulated motion vector is set to a negative adjustment threshold value and then the output image is decided based on the accumulated motion vector. If the accumulated motion vector is positive, as shown in Step 550, a positive adjustment threshold value is adopted as the accumulated motion vector and then the output image is decided based on the accumulated motion vector. Thereby, undefined pixels are omitted from the output image, and meanwhile, the intentional effects of moving the image-capturing product horizontally made by the user are retained.

Figure 6:
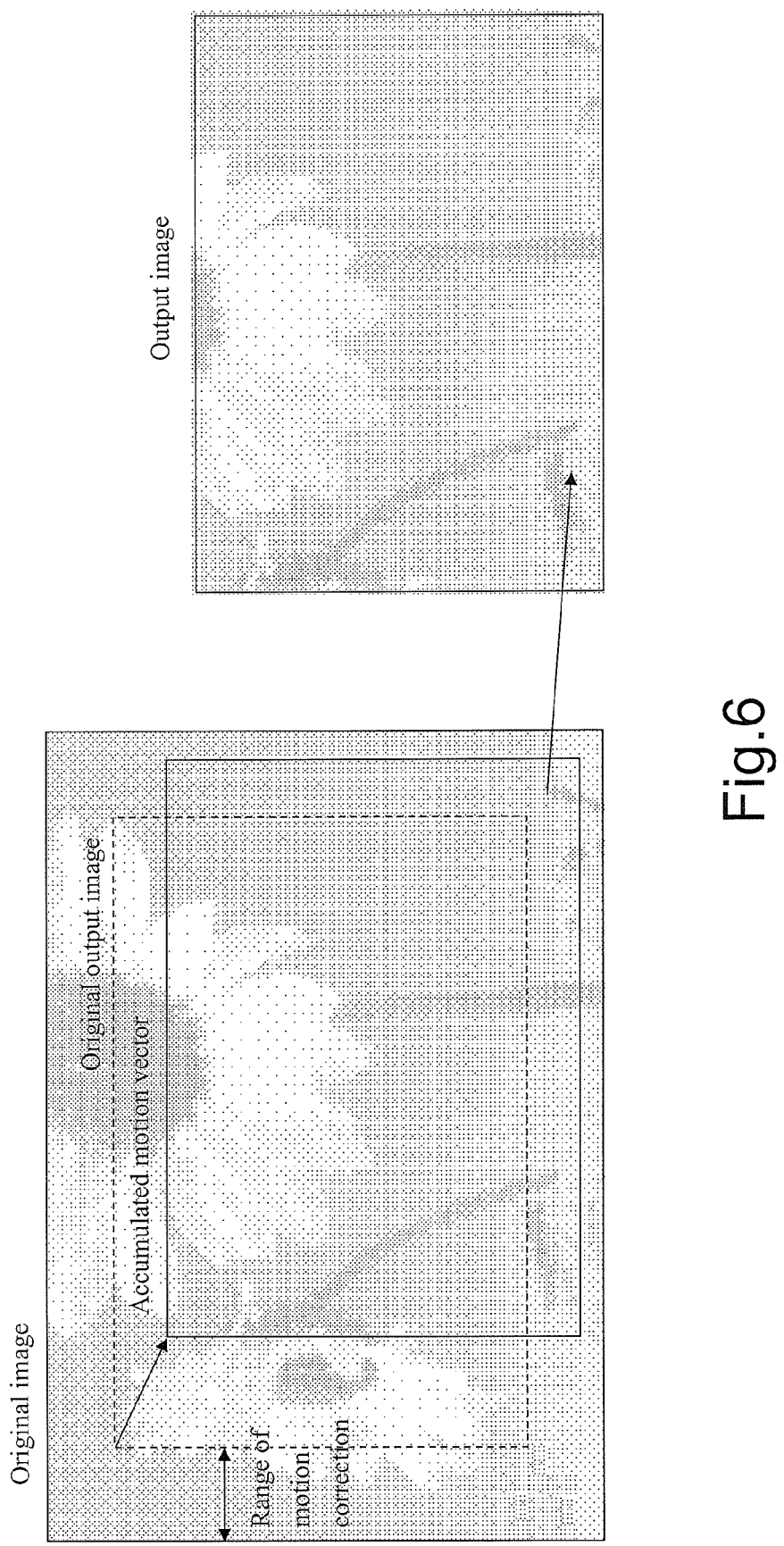
FIG. 6 illustrates an original image and an output image according to one embodiment of the present invention.

FIG. 6 illustrates an original image and an output image according to one embodiment of the present invention. If the accumulated motion vector of the whole image sequence does not exceed the motion correction range, the system 100 may operate to cut out a stabile output image having resolution smaller than the original image based on the accumulated motion vector.

In conclusion, the method and system for digital image stabilization in the present invention calculate the local motion vectors of two adjacent images by matching the interlaced Gray-coded bit-planes. In view of hardware, the interlaced Gray-coded bit-planes may be established to produce matching results merely by XOR logic gate. Hence, the method and system of the present invention can be realized easily, and cause no delay in time nor increase the production costs. In addition, the complexity of performing matching based on the original images is effectively reduced. Furthermore, Gray codes have the characteristic that any adjacent codewords only have one different bit. Matching by interlaced Gray-coded bit-planes is a solution to the problem that two pixels having similar gray-scale values may be differentiated in some original bit-planes and impair the accuracy of matching. In addition, using the correlation measures obtained when calculating local motion vectors to estimate the global motion vector is more reliable and requires no additional time for calculation. Therefore, the image sequence is stabilized quickly and accurately to produce favorable digital image stabilization effects.

Although the present invention has been disclosed by the above embodiments, they are not intended to limit the present invention. Anybody skilled in the art may make modifications and variations without departing from the spirit and scope of the present invention. Therefore, the protection scope sought by the present invention falls in the appended claim.

What is claimed is:

1. A method for digital image stabilization, applicable to an image sequence, wherein the image sequence comprises a plurality of images conforming to a pixel depth, the method comprising:

dividing a current image into a plurality of target blocks, and defining a search area corresponding to each of the target blocks in a previous image;

defining K Gray-coded bit-planes based on a plurality of raw bit-planes corresponding to the current image and defining K Gray-coded bit-planes based on a plurality of raw bit-planes corresponding to the previous image, wherein K is a positive integer smaller than the pixel depth;

comparing each of the target blocks and the corresponding search area thereof which are respectively formed by interlacing the corresponding K Gray-coded bit-planes, so as to obtain a plurality of correlation measures between each of the target blocks and the corresponding search area thereof;

estimating a global motion vector indicating a motion of the current image relative to the previous image, based on an average value and a minimum value of the correlation measures of each of the target blocks; and calculating an accumulated motion vector reflecting a motion of the image sequence based on the global motion vector, and determining an output image from the current image based on the accumulated motion vector.

2. The method for digital image stabilization as claimed in claim 1, wherein the target blocks do not overlap with each other, and each of the target blocks is smaller than or equal to the corresponding search area thereof.

3. The method for digital image stabilization as claimed in claim 1, further comprising:

performing a Gray-coded transformation on the raw bit-planes; and adopting K transformed raw bit-planes to serve as the K Gray-coded bit-planes.

4. The method for digital image stabilization as claimed in claim 1, wherein, before the step of comparing the target blocks and the corresponding search areas thereof which are respectively formed by interlacing the corresponding K Gray-coded bit-planes, the method further comprises:

selecting one of the target blocks;

defining a plurality of candidate blocks in the search area corresponding to the selected target block, wherein a size of each of the candidate blocks conforms to the target block;

dividing the selected target block and each of the candidate blocks into a plurality of grids, wherein each of the grids represents a pixel; and assigning one of the K Gray-coded bit-planes corresponding to the current image to every K grids of the selected target block and assigning one of the K Gray-coded bit-planes corresponding to the previous image to every K grids of each of the candidate blocks in an interlaced manner, so as to form the interlaced Gray-coded bit-planes of the selected target block and the candidate blocks respectively.

5. The method for digital image stabilization as claimed in claim 4, wherein the step of comparing the selected target block and the corresponding search area thereof to obtain the correlation measures further comprises:

performing a Boolean function operation on the interlaced Gray-coded bit-planes of the selected target block and the candidate blocks, and adopting the operation results as the correlation measures of the selected target block.

6. The method for digital image stabilization as claimed in claim 5, wherein, after the step of performing the Boolean function operation, the method further comprises:

adopting a motion vector having the smallest correlation measures to serve as a local motion vector of the selected target block.

7. The method for digital image stabilization as claimed in claim 6, further comprising:

defining a plurality of value zones, and each of the value zones corresponds to an accumulated weighted value;

calculating the average value and the minimum value of the correlation measures of the selected target block;

obtaining a difference of the average value and the minimum value;

determining to which value zone the difference belongs; and providing the accumulated weighted value corresponding to the local motion vector of the selected target block.

8. The method for digital image stabilization as claimed in claim 7, wherein the step of estimating the global motion vector indicating the motion of the current image further comprises:

computing the local motion vector having the highest accumulation times based on the local motion vectors of the target blocks and the corresponding accumulated weighted values thereof; and adopting the local motion vector having the highest accumulation times to serve as the global motion vector of the current image.

9. The method for digital image stabilization as claimed in claim 1, wherein the step of computing the accumulated motion vector comprises:

calculating a sum of the global motion vectors estimated based on every two adjacent images between an initial image and the current image; and adopting the sum as the accumulated motion vector.

10. The method for digital image stabilization as claimed in claim 1, wherein a resolution of the output image is smaller than a resolution of the current image.

11. The method for digital image stabilization as claimed in claim 1, wherein the step of determining the output image based on the accumulated motion vector comprises:

providing an adjustment threshold value;

determining the output image based on the accumulated motion vector when the accumulated motion vector is smaller than or equal to the adjustment threshold value; and determining the output image based on the positive or negative of the accumulated motion vector and the adjustment threshold value when the accumulated motion vector is larger than the adjustment threshold value.

12. The method for digital image stabilization as claimed in claim 11, wherein the adjustment threshold value corresponds to the resolutions of the current image and the output image.

13. A system for digital image stabilization, comprising:

a local motion vector computing device for receiving an image sequence comprising a plurality of images conforming to a pixel depth, dividing the current image into a plurality of target blocks, defining a search area corresponding to each of the target blocks in the previous image, defining K Gray-coded bit-planes based on a plurality of raw bit-planes corresponding to the current image and defining K Gray-coded bit-planes based on a plurality of raw bit-planes corresponding to the previous image, and comparing each of the target blocks and the corresponding search area thereof which are respectively formed by interlacing the corresponding K Gray-coded bit-planes, so as to obtain a plurality of correlation measures of the target blocks and the search area, wherein K is a positive integer smaller than the pixel depth;

a global motion vector computing device coupled to the local motion vector computing device for estimating a global motion vector indicating a motion of the current image relative to the previous image, based on an average value and a minimum value of all the correlation measures of each target block; and a motion correction device coupled to the global motion vector computing device for calculating an accumulated motion vector reflecting a motion of the image sequence based on the global motion vector, and determining an output image from the current image according to the accumulated motion vector.

14. The system for digital image stabilization as claimed in claim 13, wherein the target blocks do not overlap with each other, and each of the target blocks is smaller than or equal to the corresponding search area thereof.

15. The system for digital image stabilization as claimed in claim 13, wherein the local motion vector computing device further comprises:

a Gray-coded transforming unit for performing a Gray-coded transformation on the raw bit-planes and obtaining K transformed raw bit-planes to serve as the K Gray-coded bit-planes.

16. The system for digital image stabilization as claimed in claim 13, wherein the local motion vector computing device further comprises:

an interlaced Gray-coded bit-plane generating unit for selecting one of the target blocks, defining a plurality of candidate blocks in the search area corresponding to the selected target block, respectively dividing the selected target block and the candidate blocks into a plurality of grids, assigning one of the K Gray-coded bit-planes corresponding to the current image to every K grids of the selected target block and assigning one of the K Gray-coded bit-planes corresponding to the previous image to every K grids of each of the candidate blocks in an interlaced manner, so as to respectively form the interlaced Gray-coded bit-planes of the selected target block and the candidate blocks, wherein a size of each of the candidate blocks conforms to the target block, and each of the grids represents a pixel.

17. The system for digital image stabilization as claimed in claim 16, wherein the local motion vector computing device further comprises:

a matching unit for performing a Boolean function operation on the interlaced Gray-coded bit-planes of the selected target block and the candidate blocks, and adopting the operation results as the correlation measures of the selected target block.

18. The system for digital image stabilization as claimed in claim 17, wherein the matching unit adopts a motion vector having the smallest correlation measures to serve as a local motion vector of the selected target block.

19. The system for digital image stabilization as claimed in claim 17, wherein the matching unit calculates the average value and the minimum value of the correlation measures of the selected target block, and the global motion vector computing device defines a plurality of value zones respectively corresponding to an accumulated weighted value, after obtaining a difference of the average value and the minimum value, determines to which value zone the difference belongs, and provides the accumulated weighted value corresponding to the local motion vector of the selected target block.

20. The system for digital image stabilization as claimed in claim 19, wherein the global motion vector computing device obtains the local motion vector having the highest accumulation times based on the local motion vector of each target block and the corresponding accumulated weighted value thereof, and adopts the local motion vector having the highest accumulation times to serve as the global motion vector of the current image.

21. The system for digital image stabilization as claimed in claim 13, wherein the motion correction device calculates a sum of the global motion vectors estimated based on every two adjacent images between the initial image and the current image, and adopts the sum to serve as the accumulated motion vector.

22. The system for digital image stabilization as claimed in claim 13, wherein the resolution of the output image is smaller than the resolution of the current image.

23. The system for digital image stabilization as claimed in claim 13, wherein the motion correction device obtains an adjustment threshold value, determines the output image based on the accumulated motion vector when the accumulated motion vector is smaller than or equal to the adjustment threshold value, and determines the output image based on the positive or negative of the accumulated motion vector and the adjustment threshold value when the accumulated motion vector is larger than the adjustment threshold value.

24. The system for digital image stabilization as claimed in claim 23, wherein the adjustment threshold value corresponds to the resolutions of the current image and the output image.

* * * * *